US012663102B2

(12) United States Patent
Battaglia

(10) Patent No.: US 12,663,102 B2
(45) Date of Patent: Jun. 23, 2026

(54) REINFORCED RECYCLABLE FLEXIBLE HOSE

(71) Applicant: FITT S.p.A., SAndrigo (IT)

(72) Inventor: Luca Battaglia, Bassano del Grappa (IT)

( * ) Notice: Subject to any disclaimer, the term of this patent is extended or adjusted under 35 U.S.C. 154(b) by 454 days.

(21) Appl. No.: 18/268,715

(22) PCT Filed: Dec. 21, 2021

(86) PCT No.: PCT/IB2021/062107
§ 371 (c)(1),
(2) Date: Jun. 21, 2023

(87) PCT Pub. No.: WO2022/137119
PCT Pub. Date: Jun. 30, 2022

(65) Prior Publication Data
US 2024/0035595 A1      Feb. 1, 2024

(30) Foreign Application Priority Data

Dec. 23, 2020      (IT) ........................ 102020000032297

(51) Int. Cl.
*F16L 11/08*          (2006.01)
*B29C 48/00*          (2019.01)
(Continued)

(52) U.S. Cl.
CPC .......... *F16L 11/085* (2013.01); *B29C 48/022* (2019.02); *B29B 9/12* (2013.01);
(Continued)

(58) Field of Classification Search
CPC ...... F16L 11/085; B29C 48/022; B29C 48/09; B29C 48/151; B29C 48/21; B29B 9/12;
(Continued)

(56) References Cited

U.S. PATENT DOCUMENTS

| 9,841,125 B2* | 12/2017 | Clark | .................... | B29C 48/151 |
| 12,331,850 B2* | 6/2025 | Clark | ..................... | B32B 25/10 |

(Continued)

FOREIGN PATENT DOCUMENTS

| EP | 0933576 | 8/1999 |
| EP | 1059479 | 12/2000 |

(Continued)

OTHER PUBLICATIONS

The State Intellectual Property Office of People's Republic of China, The First Office Action for application No. 202180093410.3.

(Continued)

*Primary Examiner* — Amy J. Sterling
(74) *Attorney, Agent, or Firm* — Themis Law

(57) ABSTRACT

A reinforced flexible hose for transporting fluids includes a first load-bearing layer made of a first polymeric material, a second covering layer arranged externally to the first load-bearing layer made of a second polymeric material, and a reinforcement layer interposed between the first and the second layers made of a third polymeric material. The first and the second polymeric materials are thermoplastic elastomers, the third polymeric material being a thermoplastic polymeric material. The first, second and third polymeric materials are mutually compatible, so that the flexible hose can be ground without separation between the first, the second, and the reinforcement layer to obtain a ground mixture consisting of the first, the second and the third polymeric materials.

12 Claims, 1 Drawing Sheet

(51) Int. Cl.

| | |
|---|---|
| *B29B 9/12* | (2006.01) |
| *B29B 17/04* | (2006.01) |
| *B29C 48/09* | (2019.01) |
| *B29K 21/00* | (2006.01) |
| *B29K 23/00* | (2006.01) |
| *B29K 105/00* | (2006.01) |
| *B29K 105/26* | (2006.01) |

(52) U.S. Cl.

CPC ........... *B29B 17/0412* (2013.01); *B29C 48/09* (2019.02); *B29K 2021/003* (2013.01); *B29K 2023/12* (2013.01); *B29K 2023/16* (2013.01); *B29K 2105/0094* (2013.01); *B29K 2105/26* (2013.01); *B29K 2995/007* (2013.01)

(58) Field of Classification Search

CPC .......... B29B 17/0412; B29K 2021/003; B29K 2023/12; B29K 2105/0094; B29K 2105/26; B29K 2995/007; B29K 2101/12; B29L 2009/00; B29L 2023/005; B32B 2272/00; B32B 2274/00; B32B 2307/51; B32B 2307/536; B32B 2307/738; B32B 2597/00; B32B 5/028; B32B 7/02; B32B 25/042; B32B 25/10; B32B 2250/03; B32B 2250/04; B32B 25/16; B32B 25/18; B32B 1/08; B32B 2250/05; B32B 2250/40; B32B 2262/0253

See application file for complete search history.

(56) References Cited

U.S. PATENT DOCUMENTS

| | | |
|---|---|---|
| 2012/0245238 A1 | 9/2012 | Zerafati et al. |
| 2018/0299038 A1* | 10/2018 | Mezzalira ............... B32B 25/14 |

FOREIGN PATENT DOCUMENTS

| | | |
|---|---|---|
| JP | 2001041362 | 2/2001 |
| JP | 2006207648 | 8/2006 |
| KR | 101485091 | 1/2015 |

OTHER PUBLICATIONS

The State Intellectual Property Office of People's Republic of China, The Second Office Action for application No. 202180093410.3.

Japanese Patent Office, Office Action for application No. 2023-539068, Dec. 9, 2025.

* cited by examiner

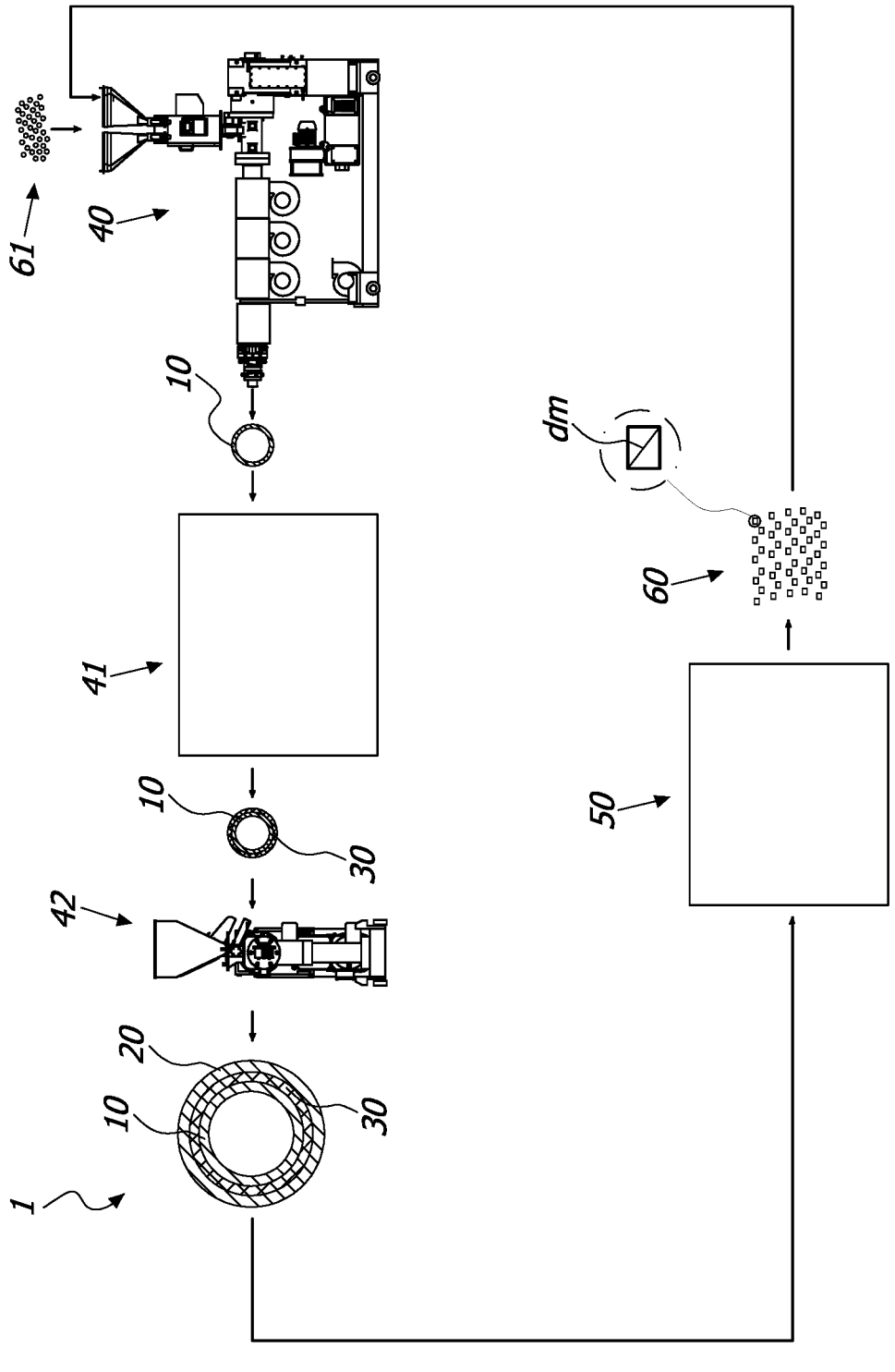

REINFORCED RECYCLABLE FLEXIBLE HOSE

FIELD OF THE INVENTION

The present invention relates to the technical field of flexible hoses, for example irrigation hoses, and in particular it relates to a recyclable reinforced flexible hose, as well as a ground mixture obtained by grinding such flexible hose and a method for making a reinforced flexible hose starting from such ground mixture.

Definitions

In the present document, the expression "textile reinforcement layer" or "reinforcement layer" or its derivatives is used to indicate a layer consisting of at least one textile yarn arranged on the underlying layer. The "reinforcement layer" is arranged on the load-bearing layer so as to leave portions thereof—generally square, rectangular or rhomboidal-shaped—vacant.

In the present document, the expression "cross-hatched textile layer" or "cross-hatched layer" or "cross-hatching" or its derivatives is used to indicate a layer consisting of at least two yarns or groups of yarns spiral-wound on the load-bearing layer with opposite inclinations and mutually superimposed but not connected. Therefore, a cross-hatching consists of two or more superimposed spirallings.

In the present document, the expression "knitted textile layer" or "knitted layer" or "knitting" or its derivatives is used to indicate a layer consisting of at least two yarns or groups of yarns deposited on the load-bearing layer and connected together to form a plurality of chain stitches, known as "tricot" type stitches.

In the present document, the expression "compatible materials" or its derivatives is used to indicate materials which have mutual chemical and/or physical compatibility, that is materials which, once coupled, give rise to a joint suitable to withstand the transfer of tensile or shear forces through the contact surface. Thus, the maximum compatibility will be observed in identical materials or materials having matrices of the same base.

In the present document, the expression "matrix" of a polymeric material or its derivatives is used to indicate a polymer capable of providing the molecular structure of the finished product.

In the present document, the expression "polymeric material" or its derivatives is used to indicate both the single polymer and a mixture of polymers, for example a blend or a compound.

STATE OF THE ART

It is known that reinforced flexible hoses essentially consist of two parts, a tubular part made of polymeric material and a part made of yarn which forms the reinforcement. Generally, the tubular part consists of two or more layers made of polymeric material, between which the reinforcement yarn is arranged.

Usually, the reinforcement yarn is made of a material incompatible with the polymeric material which forms the part made of polymer. In turn, the materials forming the layers of the polymeric part are not always compatible with each other, a condition necessary for the recyclability of the flexible hose.

However, even in the case of compatible materials of the polymeric part, the incompatibility between the latter and the yarn material requires an operation for separating the two parts for hose recyclability purposes.

This operation is long, expensive and difficult to carry out, which makes recycling of the flexible hose economically inconvenient, even at industrial level as recycling of production waste.

Furthermore, it is basically impossible to separate the yarn from the tubular part of the hose at 100%, this resulting in the fact that the granule of recycled material always contains a more or less high percentage of impurities. As clear, this has a negative impact on the mechanical properties of the hose made of this material.

SUMMARY OF THE INVENTION

The object of the present invention is to overcome the drawbacks outlined above by providing a reinforced flexible hose that is highly effective and relatively cost-effective.

A further object of the present invention is to provide a reinforced flexible hose that is easily recyclable.

A further object of the present invention is to provide a reinforced flexible hose which, once suitably recycled, provides a novel flexible tube having mechanical properties comparable to the original one.

These and other objects which will be more apparent hereinafter, are attained by a reinforced flexible hose, as well as a ground mixture and method for the manufacturing thereof, as described and/or claimed and/or illustrated herein.

Therefore, the invention relates to a reinforced flexible hose for transporting fluids which includes:

at least one first load-bearing layer made of a first polymeric material;

at least one second covering layer arranged externally to said at least one first load-bearing layer made of a second polymeric material;

at least one reinforcement layer interposed between said at least one first and one second layer made of a third polymeric material;

wherein said first and second polymeric material are thermoplastic elastomers, said third polymeric material being of the thermoplastic type;

wherein said first, second and third polymeric material are mutually compatible.

In this manner, the flexible hose can be ground without separating the former and the reinforcement layer to obtain a ground mixture consisting of first, second and third polymeric material.

Suitably, the ground mixture may have a Shore A hardness measured according to ISO 868:2003 greater than the weighted average of the Shore A hardness measured according to ISO 868:2003 of first and second polymeric material, preferably of 8 Sh A-20 Sh A, and even more preferably of 10 Sh A-18 Sh A.

Advantageously, the first and/or second polymeric material may be a compound whose composition includes the third polymeric material.

For example, the thermoplastic elastomer forming the first and second polymeric material may be a TPV including EDPM and polypropylene, for example Santoprene® marketed by Exxonmobil Corporation, or a TPE-S including SEBS and polypropylene, for example Nilflex SH® marketed by Taro Plast SpA, while the third thermoplastic polymeric material may be polypropylene.

On the other hand, a ground mixture obtained by grinding the aforementioned flexible hose may be provided for, the <table><tr><td>3</td><td>4</td></tr></table> mixture having a plurality of polygonal flakes preferably having a greater diagonal comprised between 3 mm and 25 mm.

On the other hand, a method for making a reinforced flexible hose for transporting fluids starting from the ground mixture according to the preceding claim may be provided for, the method comprising the steps of:

extruding a fourth polymeric material comprising or consisting of said ground mixture to obtain at least one first layer, preferably a load-bearing layer;

preferably, making—above said load-bearing layer—at least one reinforcement layer made of a fifth polymeric material compatible with said fourth polymeric material.

Suitably, the fourth polymeric material may comprise the ground mixture and at least one sixth polymeric material compatible therewith in a by weight ratio comprised between 1:99 and 10:90.

Advantageously, the ground mixture may be obtained starting from the production waste of a production line of the hose from which it derives.

The dependent claims define advantageous embodiments of the invention.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein:

FIG. 1 is a schematic view of a line for the production of the reinforced flexible hose 1.

DETAILED DESCRIPTION OF SOME PREFERRED EMBODIMENTS

With reference to the mentioned figures, herein described is a flexible garden hose 1 for irrigating flowers, plants or the like. Such hoses are, in a per se known manner, suitable to be connected to a domestic water mains by means of a special fitting, so that the hose transports drinking water from the appliance of the domestic water mains, for example a tap, to the point to be irrigated, for example a garden, a flowerbed or the like.

Although hereinafter reference will always be made to a garden hose, it is clear that the hose according to the invention may be used for any purpose without departing from the scope of protection of the attached claims.

The hose 1 may essentially include one or more inner load-bearing layers 10, one or more outer covering layers 20 and one or more textile reinforcement layers 30 interposed between them.

It is clear that although hereinafter reference will be made to a three-layer hose, the hose according to the invention may have any number of layers, whether they are made of polymeric material or reinforcement textiles, without departing from the scope of protection of the attached claims.

The inner 10 and outer 20 layers may be made of respective compatible polymeric materials, and preferably they will be made of the same polymeric material.

These polymeric materials may be of the thermoplastic elastomeric type, for example TPV, TPE-S, TPE-O or TPE-A.

Preferably, the material of the inner and outer layers 10, 20 may be a TPV compound having an EPDM matrix, for example consisting of a mixture of EPDM, polypropylene and paraffinic oil, or a SEBS-based TPE-S compound, for example consisting of a mixture of SEBS, polypropylene and paraffinic oil.

Suitably, the overall Shore A hardness measured according to ISO 868:2003 of the materials of the inner and outer layers 10, 20 may be comprised between 60 ShA and 75 ShA in the case of the aforementioned EPDM-based compound and between 35 ShA and 55 ShA in the case of the aforementioned SEBS-based compound.

If there is a difference between the Shore A hardness of the materials of the inner and outer layers 10, 20, the overall hardness may be measured from the average hardness of the two materials that form such layers, weighted with respect to the weight of the individual layer with respect to the total weight of the layers.

Furthermore, advantageously, the overall melt flow index measured according to ISO 1133—230° C.—5 Kg of the materials of the inner layer 10 or of that of the outer layer 20 may be comprised between 1 g/10 min and 5 g/10 min in the case of the aforementioned EPDM-based compound and according to ISO 1133—190° C.—5 Kg of the materials of the inner and outer layers 10, 20 may be comprised between 5 g/10 min and 10 g/10 min in the case of the aforementioned SEBS-based compound.

On the other hand, the reinforcement layer 30 may be made of a fibrous polymeric material compatible with the aforementioned materials.

For example, in the case of inner and outer layers 10, 20 made of TPV, TPE-S or TPE-O, the reinforcement layer 30 may be made of polypropylene, whereas in the case of inner and outer layers 10, 20 made of TPE-A, the reinforcement layer 30 may be made of polyamide. Suitably, the reinforcement layer 30 may have any configuration, for example knitted or cross-hatched.

In a per se known manner, as particularly illustrated in FIG. 1, the hose 1 may be produced by extruding the first polymeric material in a first extruder 40 to obtain the inner layer 10, subsequently obtaining the reinforcement layer on the latter in a knitting machine, cross-hatching machine or spiralling machine 41 and then by co-extruding the covering layer 20 on the output semi-finished product by means of the extruder 42.

Thanks to the compatibility between the aforementioned polymeric materials, the flexible hose 1 may be ground in a shredder 50 of the per se known type, for example TRM 600 marketed by CMG Spa, without previously separating the polymeric part of the hose consisting of the inner and outer layers 10, 20 and the reinforcement layer 30.

This allows to obtain a ground mixture 60 consisting of the materials of the layers 10, 20 and 30, which are mutually compatible. Suitably, the flakes may be generally polygonal-shaped, for example square or rectangular-shaped, with a greater diagonal dm comprised between 3 mm and 25 mm.

The Shore A hardness measured according to ISO 868:2003 of the ground mixture 60 may be greater than the overall one of the materials of the inner and outer layers 10, 20 of 8 Sh A-20 Sh A, and preferably of 10 Sh A-18 Sh A.

In a preferred but non-exclusive embodiment of the invention, in the aforementioned example of inner and outer layers 10, 20 made of EPDM-based TPV including polypropylene and reinforcement layer 30 made of polypropylene, the ground mixture 60 will include EPDM and polypropylene, the latter in a greater amount than the amount of polypropylene of virgin TPV.

In this case, the weighted average of the Shore A hardness measured according to ISO 868:2003 of the materials that form the inner and outer layers 10, 20 may be comprised between 60 Sh A and 75 Sh A, while the Shore A hardness measured according to ISO 868:2003 of the ground mixture 60 may be comprised between 70 Sh A and 90 Sh A.

Still in this case, the melt flow index measured according to ISO 1133—230° C.—5 kg of the ground mixture 60 may be higher than that of the materials of the inner and outer layers 10, 20 of 8 g/10 min-25 g/10 min For example, the melt flow index measured according to ISO 1133—230° C.—5 Kg of each of the materials of the inner and outer layers 10, 20 may be comprised between 1 g/10 min and 5 g/10 min, whereas the melt flow index measured according to ISO 1133—230° C.—5 Kg of the ground mixture 60 can be comprised between 10 g/10 min and 30 g/10 min.

In a further preferred but non-exclusive embodiment of the invention, with inner and outer layers 10, 20 made of SEBS-based TPE-S—including polypropylene and reinforcement layer 30 made of polypropylene, the ground mixture 60 will include SEBS and polypropylene, the latter in a greater amount than the amount of polypropylene of virgin TPE-S.

In this case, the weighted average of the Shore A hardness measured according to ISO 868:2003 of the materials that form the inner and outer layers 10, 20 may be comprised between 35 Sh A and 55 Sh A, while the Shore A hardness measured according to ISO 868:2003 of the ground mixture 60 may be comprised between 55 Sh A and 75 Sh A.

As schematically illustrated in FIG. 1, the ground mixture 60 may be used as a raw material for making a novel reinforced flexible hose for transporting fluids. Possibly, to this end the ground mixture 60 may be suitably added, for example by adding paraffinic oil thereto.

In this sense, the invention may define a method for recycling the production waste of a flexible hose production line, in which the discarded flexible hoses are recycled and transformed into raw material for novel hoses.

In this production line, the ground mixture 60 is used as is or, as illustrated in FIG. 1, cut with blended compatible virgin material 61.

The by weight ratio between the ground mixture 60 and the compatible virgin material 61 may be comprised between 1:99 and 30:70. Beyond this by weight ratio, the mechanical properties of the polymer obtained would not be suitable for making a flexible hose of the type described above.

In view of the fact that the average industrially acceptable production waste for a flexible hose production line is at most 5%, obtaining a by weight ratio with high amounts of ground mixture 60 will require to accumulate a large amount of production waste over several working days.

This obviously requires adequate management of production waste and storage space at the production site.

Therefore, preferably, the by weight ratio between the ground mixture 60 and the compatible virgin material 61 may be comprised between 1:99 and 10:90.

This allows to periodically recycle—for example every half working day or at the end of the working day—the production waste of one working day at most without requiring accumulation of production waste and relative management.

The combination of the virgin material 61 and the ground mixture 60 may form the first polymeric material, as illustrated in FIG. 1, and/or the second polymeric material without departing from the scope of protection of the attached claims. In other words, the combination of the virgin material 61 and the ground mixture 60 may be used to obtain the load-bearing or covering layer of the hose.

In the aforementioned example, in which the virgin material 61 is virgin TPV, the ground mixture 60 may derive from the grinding of the production waste of TPV hoses as described above.

In order to repeat the aforementioned cycle in a circular economy logic, the novel hose may include a reinforcement layer made of compatible material, for example polypropylene.

The aforementioned characteristics will allow to obtain a fully and easily recyclable hose, simply by inserting it into a shredder 60 without a prior operation of separating the reinforcement layer from the rest of the hose.

The obtained ground mixture may be used for making new hoses. As clear, this lowers both the costs and the environmental impact entailed in manufacturing the hose.

The invention will be clearer in the light of the following examples.

EXAMPLES

Preparing the Hoses 4 samples measuring 10 m of hose were prepared using the following raw materials:

inner layer: Santoprene® 201-64 marketed by Exxonmobil Corporation® outer layer: Santoprene® 201-73 marketed by Exxonmobil Corporation® reinforcement layer: PP Yarn 1200 DN "AT" TANG C.WHITE marketed by Industrias Ponsa, S.A.

The hoses were made in a per se known manner by extruding the inner and the outer layer by means of an extruder of the per se known type and by forming—on the inner layer—a knitted layer with chain stitches of the tricot type of the NTS® (Samples 3 and 4) or DCT® (Samples 1 and 2) type by means of a knitting machine of the per se known type.

The percentage weighted distribution in the four samples is:

| SAMPLE | NOMIN DIA. Inches | INN LAYER. % | REINF LAYER. % | OUT LAYER. % |
|---|---|---|---|---|
| Samp 1 | 5/8" | 50 | 12.5 | 37.5 |
| Samp 2 | 3/4" | 52 | 10.9 | 37.1 |
| Samp 3 | 1/2" | 54 | 8.3 | 37.7 |
| Samp 4 | 5/8" | 53 | 10.0 | 37 |

Measuring Shore Hardness

The overall Shore A hardness of the materials that form the aforementioned samples 1-4 was measured according to the ISO 868:2003 standard by means of a Shore durometer of the ATS FAAR Shore A type.

The overall hardness was measured by calculating the weighted average of the Shore A hardness of the inner layer made of Santoprene® 201-64 (Hardness ShA: 64) and that of the outer layer made of Santoprene® 201-73 (Hardness ShA: 73), both obviously measured according to the aforementioned standard.

The results are reported in table below.

| SAMPLE | HARDNESS ShA |
|---|---|
| Samp 1 | 67.45 |
| Samp 2 | 67.45 |
| Samp 3 | 67.41 |
| Samp 4 | 67.37 |

Measuring MFI

The MFI of the materials that form the tubular layers of the aforementioned samples 1-4 (Santoprene® 201-64 e Santoprene® 201-73) was measured according to the ISO 1133—230° C.—5 Kg standard using a melt flow tester of the Instron® CEAST Melt Flow Tester MF30 type.

The results are reported in table below.

| MATERIAL | MFI g/10 min |
|---|---|
| Santoprene ® 201-64 | 1.12 |
| Santoprene ® 201-73 | 3.81 |

Grinding Hoses

Each of the aforementioned 4 samples of hoses was inserted as is into a TRM 600 type shredder marketed by CMG Spa and ground, without prior separation of the reinforcement layer from those made of polymeric material. The flakes of the mixture thus obtained were selected using a 15 mm mesh sieve.

Measuring Shore Hardness of the Mixture

For each of the mixtures deriving from the grinding of the aforementioned samples, the Shore A hardness was measured according to the ISO 868:2003 standard using the same shore durometer mentioned above.

The results are reported in table below.

| SAMPLE | HARDNESS ShA |
|---|---|
| Samp 1 Mix | 81 |
| Samp 2 Mix | 80 |
| Samp 3 Mix | 81 |
| Samp 4 Mix | 82 |

It is therefore clear that once mixed with the polymeric materials, the polypropylene yarn of the various hose samples significantly increased the Shore A hardness of the mixture.

Measuring the MFI of the Mixture

For each of the mixtures deriving from the grinding of the aforementioned samples, the MFI was measured according to the ISO 1133—230° C.—5 Kg standard using the same melt flow tester mentioned above.

The results are reported in table below.

| SAMPLE | MFI g/10 min |
|---|---|
| Samp 1 Mix | 15.6 |
| Samp 2 Mix | 20.1 |
| Samp 3 Mix | 11.7 |
| Samp 4 Mix | 24.8 |

It is therefore clear that once mixed with the polymeric materials, the polypropylene yarn of the various hose samples significantly increased the MFI of the mixture.

Preparing New Hoses

The mixtures obtained from the aforementioned 4 samples were mixed with virgin Santoprene® 201-64 granules in a 5:95 ratio. Such mixtures of virgin and ground material were extruded to obtain respective load-bearing layers of new samples of 10 m hoses. Each of these load-bearing layers was inserted into the knitting machine to obtain the aforementioned polypropylene reinforcement layer, and Santoprene® 201-73 was subsequently extruded on the semi-finished products exiting from the knitting machine to obtain the covering layer. The weighted distribution of the new hose samples is the same as that of the aforementioned samples 1-4.

Basically, 4 hose samples were obtained similar to the starting samples both from a quality and mechanical point of view.

Mechanical Properties vs. by Weight Ratio

In order to ascertain how the mechanical properties of a polymeric material change as the by weight ratio between the ground mixture and the virgin material varies, various samples consisting of Santoprene® 201-73 and the "Sample Mix 1" (SAMP MIX 1) mentioned above were prepared in ratios ranging from 97:3 to 50:50, as reported in the table below.

The Shore A hardness according to the ISO 868:2003 standard using a shore durometer of the ATS FAAR Shore A type, the MFI according to the ISO 1133—230° C.—5 Kg standard using a melt flow tester of the Instron® CEAST Melt Flow Tester MF30 type and the tensile strength according to the ISO 37/ISO 527-2:2012 standard using a dynamometer of the Galdabini brand, Sun 2500 Model equipped with 25 kN load cell and strain gauge with a maximum speed of 600 mm/min were measured for each sample.

The tests show that there is a substantial drop in the mechanical properties of interest as the percentage of SAMP MIX 1 increases, showing the greatest difference at 35% of ground mixture.

Therefore, the maximum by weight ratio between virgin polymer and ground mixture which allows to obtain an extruded polymer suitable for making reinforced flexible hoses is 70:30.

| | Santoprene 201-73 | | Santoprene 201-73 + 3% SAMP MIX 1 | | Santoprene 201-73 + 5% SAMP MIX 1 | | Santoprene 201-73 + 10% SAMP MIX 1 | | Santoprene 201-73 + 20% SAMP MIX 1 | |
|---|---|---|---|---|---|---|---|---|---|---|
| | Hardness MFI Average [Mpa] | 73 3.81 Dev. Std. — | Hardness MFI Average [Mpa] | 79 3.82 Dev. Std. — | Hardness MFI Average [Mpa] | 79 3.85 Dev. Std. — | Hardness MFI Average [Mpa] | 79 3.9 Dev. Std. — | Hardness MFI Average [Mpa] | 78 3.99 Dev. Std. — |
| σ(5%) | 0.71 | 0.03 | 1.09 | 0.08 | 0.92 | 0.07 | 0.97 | 0.07 | 0.88 | 0.05 |
| σ(10%) | 1.17 | 0.01 | 1.5 | 0.08 | 1.38 | 0.09 | 1.4 | 0.1 | 0.1 | 0.06 |
| σ(20%) | 1.68 | 0.02 | 2.07 | 0.1 | 2 | 0.11 | 2.05 | 0.12 | 1.96 | 0.08 |
| σ(50%) | 2.49 | 0.02 | 2.85 | 0.15 | 2.8 | 0.19 | 2.85 | 0.2 | 2.74 | 0.12 |
| σ(100%) | 3.27 | 0.03 | 3.54 | 0.2 | 3.48 | 0.26 | 3.54 | 0.26 | 3.37 | 0.17 |
| σ(200%) | 4.4 | 0.05 | 4.55 | 0.26 | 4.44 | 0.35 | 4.5 | 0.37 | 4.25 | 0.22 |
| σ(300%) | 6.13 | 0.14 | 5.58 | 0.36 | 5.44 | 0.43 | 5.49 | 0.46 | 5.15 | 0.28 |
| E | | | | | | | | | | |
| Elastic modulus | 12.53 | 0.46 | 13.74 | 1.15 | 14.61 | 0.77 | 15.44 | 0.48 | 15.48 | 0.93 |

| | Santoprene 201-73 + 30% SAMP MIX 1 | | Santoprene 201-73 + 35% SAMP MIX 1 | | Santoprene 201-73 + 50% SAMP MIX 1 | | SAMP MIX 1 | |
|---|---|---|---|---|---|---|---|---|
| | Hardness MFI Average [Mpa] | 78 4.01 Dev. Std. — | Hardness MFI Average [Mpa] | 81 5.22 Dev. Std. — | Hardness MFI Average [Mpa] | 82 9 Dev. Std. — | Hardness MFI Average [Mpa] | 81 15.6 Dev. Std. — |
| σ(5%) | 0.82 | 0.06 | 1.11 | 0.08 | 1.13 | 0.04 | 1.21 | 0.14 |
| σ(10%) | 1.31 | 0.08 | 1.65 | 0.08 | 1.69 | 0.03 | 1.87 | 0.19 |
| σ(20%) | 1.97 | 0.11 | 2.25 | 0.12 | 2.36 | 0.09 | 2.66 | 0.25 |
| σ(50%) | 2.71 | 0.13 | 3.07 | 0.1 | 3.16 | 0.14 | 3.47 | 0.31 |
| σ(100%) | 3.39 | 0.15 | 3.71 | 0.15 | 3.78 | 0.22 | 4.04 | 0.38 |
| σ(200%) | 4.21 | 0.21 | 4.55 | 0.19 | 4.66 | 0.29 | 4.78 | 0.51 |
| σ(300%) | 5.07 | 0.24 | 5.52 | 0.23 | 5.58 | 0.37 | 5.57 | 0.67 |
| E | | | | | | | | |
| Elastic modulus | 16.33 | 0.95 | 18.85 | 0.92 | 19.58 | 1.67 | 15.34 | 2.36 |

The invention claimed is:

1. A method of making a recycled flexible hose for transporting fluids, comprising:

providing a ground mixture obtained by grinding a reinforced flexible hose, which includes:

a first load-bearing layer made from a first polymeric material, a second covering layer arranged externally to the first load-bearing layer, the second covering layer being made from a second polymeric material, and a reinforcement layer interposed between the first load-bearing layer and the second covering layer, the reinforcement layer being made from a third polymeric material, wherein the first and the second polymeric material are thermoplastic elastomers, the third polymeric material being a thermoplastic polymeric material, and wherein the first, the second, and the third polymeric material are mutually compatible, so that the reinforced flexible hose can be ground without separation between the first and the second layer and the reinforcement layer; and extruding a fourth polymeric material comprising the ground mixture to obtain a first layer of the recycled flexible hose, wherein the fourth polymeric material comprises the ground mixture and a sixth polymeric material com-patible therewith, the sixth polymeric material being a virgin thermoplastic elastomer, and wherein the fourth polymeric material has a weight ratio between the ground mixture and the sixth polymeric material comprised between 1:99 and 30:70, further comprising the step of:

providing a production lines configured to make the reinforced flexible hose; and making the ground mixture starting from a production waste of the production line.

2. The method according to claim 1, wherein the ground mixture has a Shore A hardness measured according to ISO 868:2003 higher than a weighted average of the Shore A hardness measured according to ISO 868:2003 of the first and the second polymeric material.

3. The method according to claim 2, wherein the Shore A hardness measured according to ISO 868:2003 of the ground mixture is higher than the weighted average of the Shore A hardness measured according to ISO 868:2003 of the first and the second polymeric material by 8 Sh A-20 Sh A.

4. The method according to claim 1, wherein the first and the second polymeric material are EPDM-based, a weighted average of a Shore A hardness measured according to ISO 868:2003 of the first and the second polymeric material being comprised between 60 Sh A and 75 Sh A, the Shore A hardness measured according to ISO 868:2003 of the ground mixture being comprised between 70 Sh A and 90 Sh A.

5. The method according to claim 1, wherein the first and second polymeric material are SEBS-based, a weighted average of a Shore A hardness measured according to ISO 868:2003 of the first and the second polymeric material being comprised between 35 Sh A and 55 Sh A, the Shore A hardness measured according to ISO 868:2003 of the ground mixture being comprised between 55 Sh A and 75 Sh A.

6. The method according to claim 1, wherein the first and the second polymeric material are EPDM-based, wherein a melt flow index measured according to ISO 1133-230° C.-5 Kg of the first or the second polymeric material is comprised between 1 g/10 min and 5 g/10 min, and wherein the melt flow index measured according to ISO 1133-230° C.-5 Kg of the ground mixture is comprised between 10 g/10 min and 30 g/10 min.

7. The method according to claim 1, wherein the first and/or the second polymeric material is a compound which includes the third polymeric material.

8. The method according to claim 1, wherein the first or the second polymeric material is a thermoplastic elastomer that is an EDPM-based TPV which includes polypropylene, or a SEBS-based TPE-S which includes polypropylene, the third polymeric material being polypropylene.

9. The method according to claim 1, wherein the ground mixture has a plurality of polygonal flakes having a greater diagonal comprised between 3 mm and 25 mm.

10. The method according to claim 1, wherein the first layer is an inner load-bearing layer and/or an outer covering layer, further comprising a step of making, above the load-bearing layer and/or below the outer covering layer, a reinforcement layer made from a fifth polymeric material compatible with the fourth polymeric material.

11. The method according to claim 1, wherein the fourth polymeric material has a weight ratio, between the ground mixture and the sixth polymeric material, comprised between 1:99 and 10:90, and wherein the ground mixture is made starting from the production waste of the production line of one working day or less so as to avoid accumulation of material to be ground.

12

12. A recycled reinforced flexible hose for transporting fluids, comprising:
   an extruded first layer comprising:
   a mixture obtained by grinding a reinforced flexible hose, the ground reinforced flexible hose comprising:
      a first load-bearing layer made from a first polymeric material,
      a second covering layer arranged externally to the first load-bearing layer, the second covering layer being made from a second polymeric material, and
      a reinforcement layer interposed between the first load-bearing layer and the second covering layer, the reinforcement layer being made from a third polymeric material,
      wherein the first and the second polymeric material are thermoplastic elastomers, the third polymeric material being a thermoplastic polymeric material, and
      wherein the first, the second, and the third polymeric material are mutually compatible, so that the reinforced flexible hose can be ground without separation between the first and the second layer and the reinforcement layer; and
   a fourth polymeric material,
   wherein the fourth polymeric material consists of the mixture and a sixth polymeric material compatible therewith, the sixth polymeric material being a virgin thermoplastic elastomer,
   wherein the fourth polymeric material has a weight ratio between the ground mixture and the sixth polymeric material comprised between 1:99 and 30:70,
   wherein the fourth polymeric material has a weight ratio, between the ground mixture and the sixth polymeric material, comprised between 1:99 and 10:90, and
   wherein the ground mixture is made starting from production waste of a production line of the recycled reinforced flexible hose of one working day or less so as to avoid accumulation of material to be ground.

* * * * *